(12) United States Patent
Allison

(10) Patent No.: US 12,396,438 B2
(45) Date of Patent: Aug. 26, 2025

(54) HORSE BOOT DRYER

(71) Applicant: Ashley Wolchina Allison, Daphne, AL (US)

(72) Inventor: Ashley Wolchina Allison, Daphne, AL (US)

(*) Notice: Subject to any disclaimer, the term of this patent is extended or adjusted under 35 U.S.C. 154(b) by 0 days.

(21) Appl. No.: 18/633,647

(22) Filed: Apr. 12, 2024

(65) Prior Publication Data
US 2024/0357996 A1 Oct. 31, 2024

Related U.S. Application Data

(60) Provisional application No. 63/462,553, filed on Apr. 28, 2023.

(51) Int. Cl.
A01K 13/00 (2006.01)

(52) U.S. Cl.
CPC .......... A01K 13/001 (2013.01); A01K 13/007 (2013.01)

(58) Field of Classification Search
CPC .... A01K 13/001; A01K 13/003; A01K 13/00; A01K 13/007; A44B 13/00; A44B 13/0052; A44B 13/0058
See application file for complete search history.

(56) References Cited

U.S. PATENT DOCUMENTS

| | | | | |
|---|---|---|---|---|
| 452,830 A * | 5/1891 | Stolpe | ...................... | A45F 5/02 224/220 |
| 2,519,528 A * | 8/1950 | Williamson | ........... | A01K 65/00 452/187 |
| 2,760,700 A * | 8/1956 | Lien | ........................ | A01K 65/00 224/103 |
| 3,172,178 A * | 3/1965 | Copell | .................. | A44C 5/2071 D2/639 |
| 3,387,753 A * | 6/1968 | Bowman | ................. | A01K 65/00 224/103 |
| 3,563,430 A * | 2/1971 | Forrest | ................... | F16B 45/026 24/598.2 |
| 4,327,850 A * | 5/1982 | Robinson, Jr. | ....... | A01M 31/006 224/103 |
| 4,960,231 A * | 10/1990 | Popovich | ............... | A01K 65/00 224/103 |
| 5,351,346 A * | 10/1994 | Hodges, Jr. | ............ | A47K 3/281 224/220 |
| 5,722,125 A * | 3/1998 | Vasilopoulos | .......... | A63B 60/62 24/301 |
| 6,434,800 B1 * | 8/2002 | James | ..................... | A63B 60/62 24/298 |
| D486,879 S * | 2/2004 | Powell | ......................... | D22/199 |
| 6,772,924 B2 * | 8/2004 | Bennett | .................. | A01K 65/00 224/103 |
| 9,420,872 B2 * | 8/2016 | Bird | ..................... | A01M 31/004 |

* cited by examiner

Primary Examiner — Ebony E Evans
(74) Attorney, Agent, or Firm — H. Brock Kolls

(57) ABSTRACT

The present invention relates to a horse boot dryer that includes a hanging tether that interconnects at both ends forming a drying loop. In operation, the drying loop can be hung from an elevated object. The horse boot dryer can comprise at least one boot holder rod and at least one tether cord. The tether cord connects at one end to the drying loop and connects at the other end to the boot holder rod. During use, the boot holder rod can be inserted through a horse boot and orientated to span the horse boot opening, preventing the horse boot from sliding off of the tether cord and allowing the horse boot to hang and dry from the horse boot dryer.

20 Claims, 6 Drawing Sheets

HORSE BOOT DRYER

CROSS-REFERENCE TO RELATED APPLICATIONS

This application contains subject matter which is related to the subject matter of the following co-pending application. The below-listed application is hereby incorporated herein by reference in its entirety:

This is a U.S. non-provisional application that claims the benefit of a U.S. provisional application, Ser. No. 63/462,553, inventor Ashley Wolchina Allison, entitled "HORSE BOOT DRYER", filed Apr. 28, 2023.

TECHNICAL FIELD OF THE INVENTION

This invention relates to a horse boot dryer and particularly to a hangable drying system in which horse boots can be slipped onto tethers and secured in position while drying.

BACKGROUND OF THE INVENTION

Before our invention, horse boots were commonly used on the legs of equine to protect them from injury. During the wearing of the boots, the boots are subject to exposure to dirt, water, perspiration from the horse, and other elements that then require the boots to be washed or otherwise dried before subsequent use. Such drying was accomplished by laying the boot on a surface. In this regard, the boots were not secured or elevated in a manner that would expedite the drying process.

Prior fixed racks that attach to a wall have shortcomings that include being large and bulky and not particularly useful for cleaning the boots. Additionally, they can be difficult to transport and reattach to a wall when needed.

The present invention addresses these and other shortcomings by providing a horse boot dryer and other advantages. For these reasons and shortcomings as well as other reasons and shortcomings there is a long-felt need that gives rise to the present invention.

SUMMARY OF THE INVENTION

The shortcomings of the prior art are overcome and additional advantages are provided through the provision of a horse boot dryer 100 that comprises a hanging tether that interconnects at both ends forming a drying loop. In operation, the drying loop can be hung from an elevated object. The horse boot dryer can comprise at least one boot holder rod and at least one tether cord. The tether cord connects at one end to the drying loop and connects at the other end to the boot holder rod. In operation, the boot holder rod can be inserted through a horse boot and orientated to span the horse boot opening, preventing the horse boot from sliding off of the tether cord and allowing the horse boot to hang and dry from the horse boot dryer.

Additional shortcomings of the prior art are overcome and additional advantages are provided through the provision of a horse boot dryer 100 that comprises a ring, a latching fastener, and a hanging tether. One end of the hanging tether can be secured to the ring and the other end of the hanging tether can be secured to the latching fastener. The latching fastener and the ring interlock, in a removable manner, forming a drying loop. In operation, the drying loop can be hung from an elevated object. The horse boot dryer can further comprise at least one latching tether fastener, at least one boot holder rod, and at least one tether cord. One end of the tether cord can be secured to the latching tether fastener and the other end of the tether cord can be secured to the boot holder rod. The latching tether fastener interlocks, in a removable manner, and hangs from the drying loop. In operation, the boot holder rod passes through and is orientated to span a horse boot, preventing the horse boot from falling off the tether cord and allowing the horse boot to hang and dry from the horse boot dryer.

Additional shortcomings of the prior art are overcome and additional advantages are provided through the provision of a horse boot dryer 100 that comprises a buckle, a receiver, and a hanging tether. One end of the hanging tether can be secured to the buckle and the other end of the hanging tether can be secured to the receiver. The buckle and the receiver interlock, in a removable manner, forming a drying loop, In operation, the drying loop can be hung from an elevated object. The horse boot dryer can further comprise at least one latching tether fastener, at least one boot holder rod, and at least one tether cord. One end of the tether cord can be secured to the latching tether fastener and the other end of the tether cord can be secured to the boot holder rod. The latching tether fastener interlocks, in a removable manner, and hangs from the drying loop. In operation, the boot holder rod passes through and is orientated to span the opening of a horse boot, preventing the horse boot from falling off the tether cord and allowing the horse boot to hang and dry from the horse boot dryer.

Additional features and advantages are realized through the techniques of the present invention. Other embodiments and aspects of the invention are described in detail herein and are considered a part of the claimed invention. For a better understanding of the invention with advantages and features, refer to the description and the drawings.

BRIEF DESCRIPTION OF THE FIGURES

The foregoing and other objects, features, and advantages of the invention are apparent from the following detailed description taken in conjunction with the accompanying drawings in which.

The detailed description explains the preferred embodiments of the invention, together with advantages and features, by way of example with reference to the drawings.

DETAILED DESCRIPTION OF THE INVENTION

Figure 1:
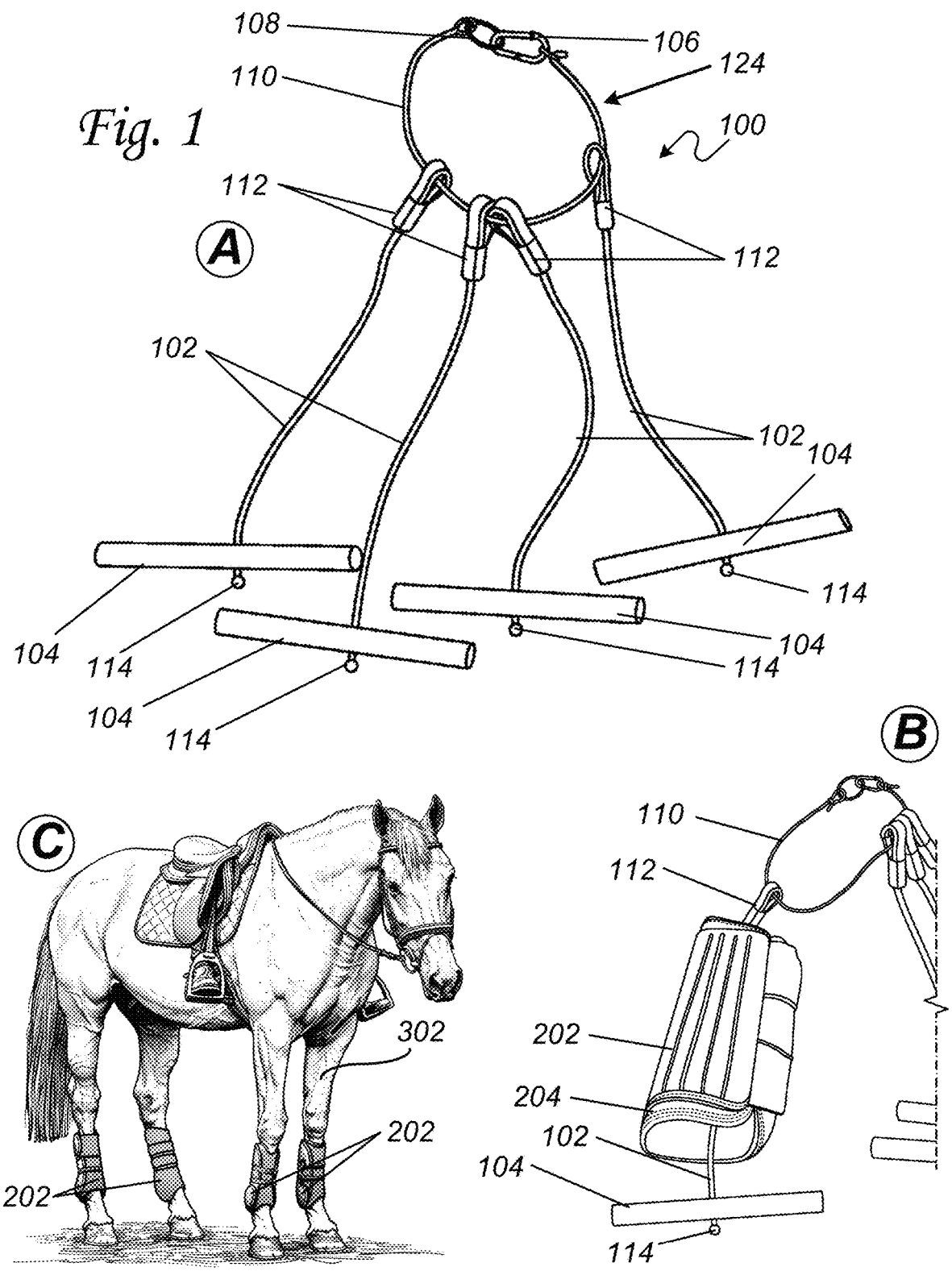
FIG. 1 illustrates one example of a horse boot dryer.

Turning now to the drawings in greater detail, it will be seen that in FIG. 1 there is illustrated one example of a horse boot dryer 100. In an exemplary embodiment, a horse boot dryer 100 can comprise a hanging tether 110 that interconnects at both ends 106/108 or 116/118 forming a drying loop 124. In operation, the drying loop 124 can be hung from an elevated object 402. Such elevated object 402, as better illustrated in at least FIGS. 3, 4, and 5 can be a barn door, a beam, a horse stall, or other convenient location, as may be required and/or desired in a particular embodiment.

In the present invention, the horse dryer 100 can be customized as to size and use variations such as small (pony boots), medium (regular horse boots), and large (very large or heavy boots) as required and/or desired in a particular embodiment. Additionally, the horse boot dryer 100 can be customized as to color combinations, hardware selection, monogram, and other suitable types and/or kinds of customizations, as may be required and/or desired in a particular embodiment.

Figure 2:
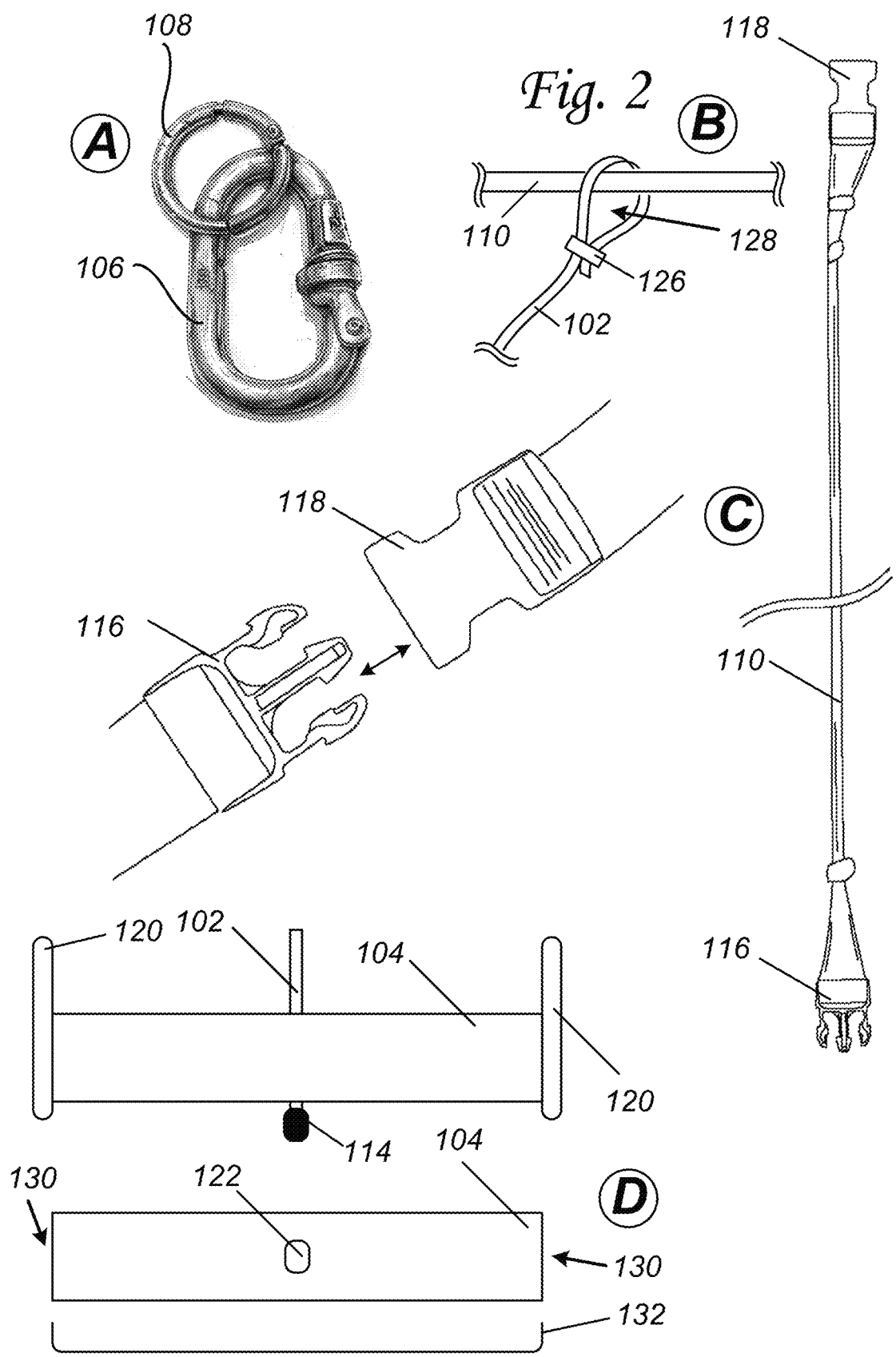
FIG. 2-5. illustrate exemplary embodiments of a horse boot dryer.

In an exemplary embodiment and as better illustrated in at least FIG. 2 reference 'A' a latching fastener 106 and a ring 108 can be attached to the ends of the hanging tether 110. In this regard, latching fastener 106 and ring 108 can be interconnected, in a removable manner, to secure the hanging tether 110 around an elevated object 402 for use. Such a latching fastener can be a carabiner, slide bolt spring snap, or other suitable latching fastener.

In another exemplary embodiment and as better illustrated in at least FIG. 2 references 'C' and 'D' a buckle 116 and a receiver 118 can be attached to the ends of the hanging tether 110. In this regard, buckle 116 and receiver 118 can be interconnected, in a removable manner, to secure the hanging tether 110 around an elevated object 402 for use.

In the present invention, an advantage is that washing and drying of the horse boots 202 can be easily accomplished while the horse boots 202 are hung in position. Additionally, the horse boots 202 can be washed, dried, and stored anywhere the horse boot dryer 100 can be hung. In the present invention, another advantage is that the horse boot dryer 100 easily folds up for transport, occupies minimal space, and hangs up in seconds at a new location when needed.

In an exemplary embodiment, there can be more than one tether cord 102 and more than one boot holder rod 104. Each of the tether cords 102 connects at one end to the hanging tether 110 and at the other end to the boot holder rod 104. During use, the boot holder rod 104 can be inserted through a horse boot 202 and orientated to span the horse boot 202 opening 204, preventing the horse boot 202 from sliding off of the tether cord 102.

Figure 4:
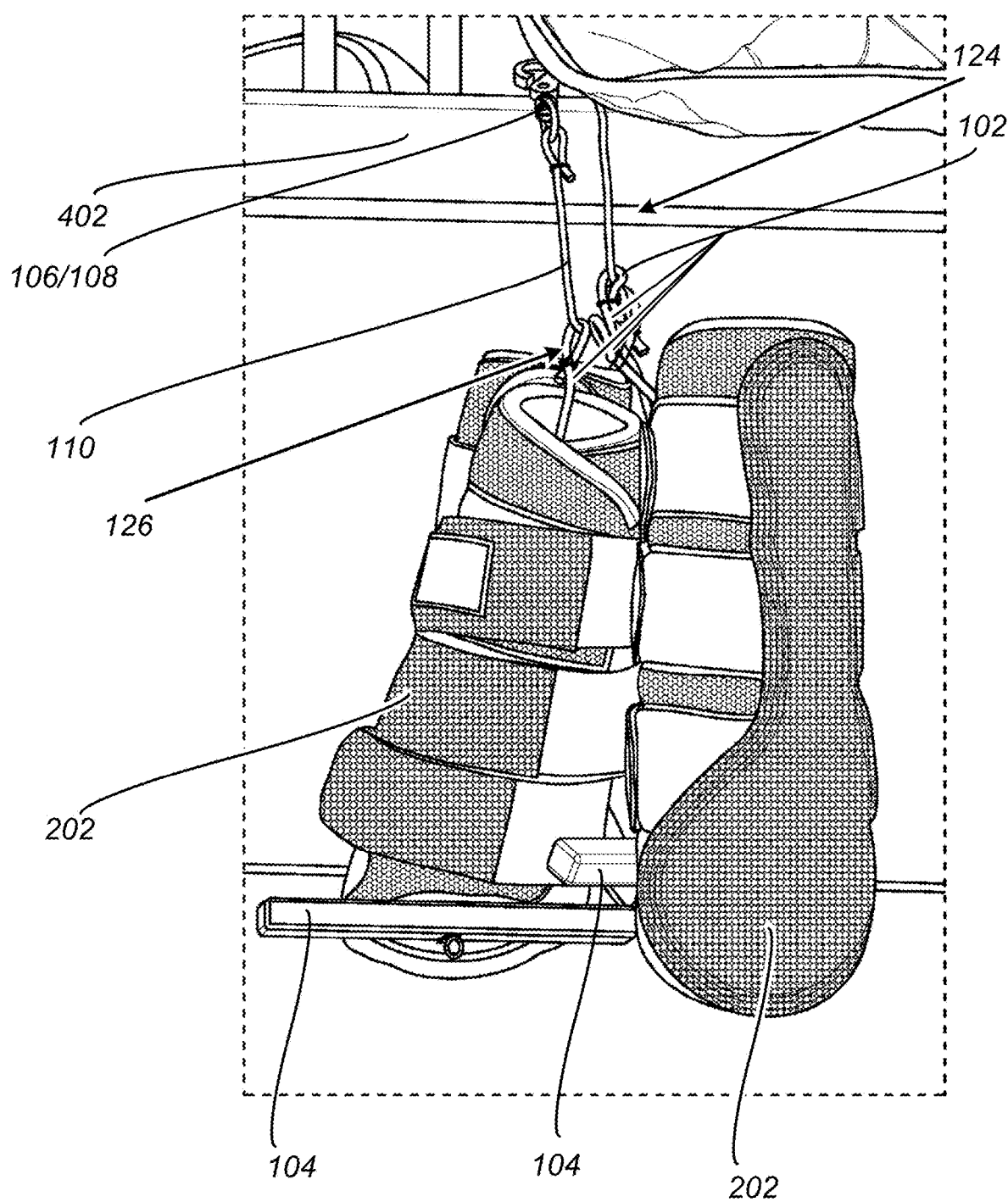

In an exemplary embodiment and as better illustrated in at least FIG. 2 reference 'B' and FIG. 4, the tether cord 102 can be looped 128 at one end so that the hanging tether 110 can pass through securing the tether cord 102 to the hanging tether 110 in a movable manner. A fastener 126 can be used to secure the tether cord 102 to itself, forming and maintaining the loop 128 at one end, as may be required and/or desired in a particular embodiment.

In an exemplary embodiment and as better illustrated in at least FIG. 1, latching tether fastener 112 can be attached to the end of the tether cord 102 and the latching tether fastener 112 can be interconnected, in a removable manner, to and hang from the drying loop 124.

The tether cord 102 can be made from a stretchable (shock cord style) material, non-stretchable materials, cords, or other suitable materials. The boot holder rod 104 can lightweight and be made from plastic, wood, metal, a combination thereof, or other suitable material. Additionally, the boot holder rods 104 width 130 can be circular, square, flat, or other suitable shape, and the length 132 of the boot holder rods 104 can be in the range of several inches selected to easily span the open 204 of the horse boot 202. In general, the boot holder rods 104 can have variable diameters and/or dimensions depending on use such as small, medium, large, and other sizes.

In an exemplary embodiment, instead of latching fastener 106 and ring 108, the hanging tether 110 can comprise a buckle 106 at one end and a receiver 108 at the other end. The buckle 116 and the receiver 118 interconnect to form the drying loop 124 that can be hung from an elevated object 402.

Referring to FIG. 2, there are illustrated exemplary embodiments of a horse boot dryer 100.

In an exemplary embodiment and with reference to FIG. 2 reference 'A', the horse boot dryer 100 can comprise a ring 108, and a latching fastener 106. One end of the hanging tether 110 can be secured to ring 108 and the other end of the hanging tether 110 can be secured to the latching fastener 106. The latching fastener 106 and ring 108 can be interlocked, in a removable manner, forming the drying loop 124.

In an exemplary embodiment and with reference to FIG. 2 reference 'C', a horse boot dryer 100 can comprise a buckle 116, a receiver 118, and a hanging tether 110. One end of the hanging tether 110 can be secured to buckle 116 and the other end of the hanging tether 110 can be secured to receiver 118. The buckle 116 and the receiver 118 interlock, in a removable manner, forming a drying loop 124, In operation, the drying loop 124 can be hung from an elevated object 402. The horse boot dryer 100 can further comprise at least one latching tether fastener 112, at least one boot holder rod 104, and at least one tether cord 102. One end of the tether cord 112 can be secured to the latching tether fastener 112 and the other end of the tether cord 102 can be secured to the boot holder rod 104. The latching tether fastener 112 interlocks, in a removable manner, and hangs from the drying loop 124. In operation, the boot holder rod 104 passes through and is orientated to span a horse boot 202, preventing the horse boot 202 from falling off the tether cord 102, and allowing the horse boot 202 to hang and dry from the horse boot dryer 100.

In an exemplary embodiment and with reference to FIG. 2 reference 'C', the horse boot dryer 100 can comprise a buckle 116, and a receiver 118. One end of the hanging tether 110 can be secured to the buckle 116 and the other end of the hanging tether 110 can be secured to the receiver 118. The buckle 116 and the receiver 118 interlock, in a removable manner, forming the drying loop 124.

In an exemplary embodiment and with reference to FIG. 2 reference 'D' and 3, the boot holder rod 104 can have a hole 122 therethrough. The tether cord 102 can be attached to the boot holder rod 104 by passing through hole 122 and knotting, bead tieing, or crimping 114 to itself, preventing the tether cord 102 from being pulled back through hole 122. In addition, hole 122 can be centrally located along the length of the boot holder rod 104, or positioned at other suitable locations as may be required and/or desired in a particular embodiment.

In an alternative embodiment, the tether cord 102 can be integrally formed into the boot holder rod 104 at one end.

In an exemplary embodiment, a raised ridge end cap 120 can be formed on each end of the boot holder rod 104. In operation, the raised ridge end cap 120 can prevent the horse boot 202 from sliding off one end of the boot holder rod 104. In this regard, the horse boot 202 can nest on the boot holder rod 104 in between the raised ridge end caps 120 preventing the horse boot 202 from sliding off the boot holder rod 104 and falling from the horse boot dryer 100.

Figure 3:
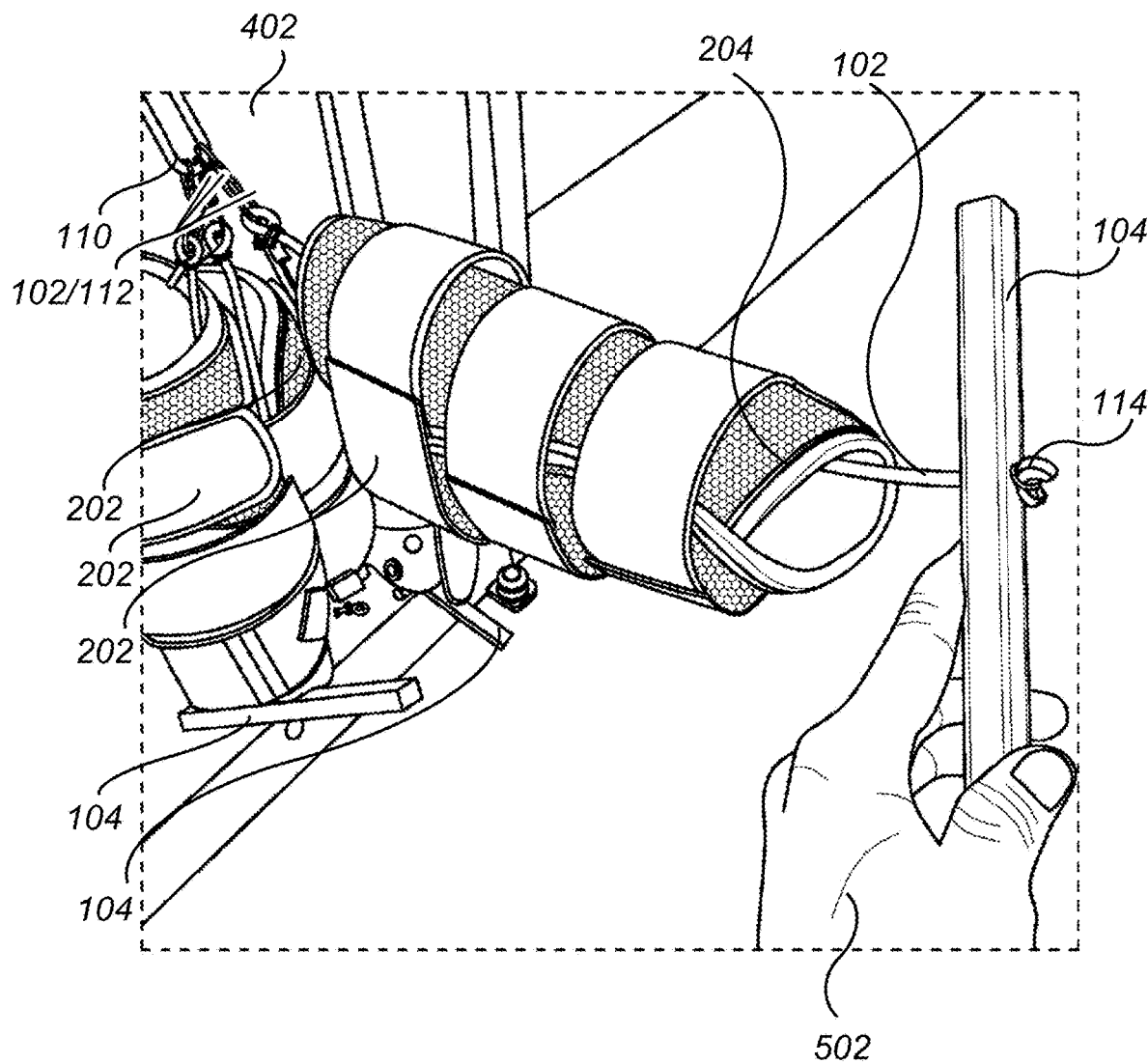
Figure 5:
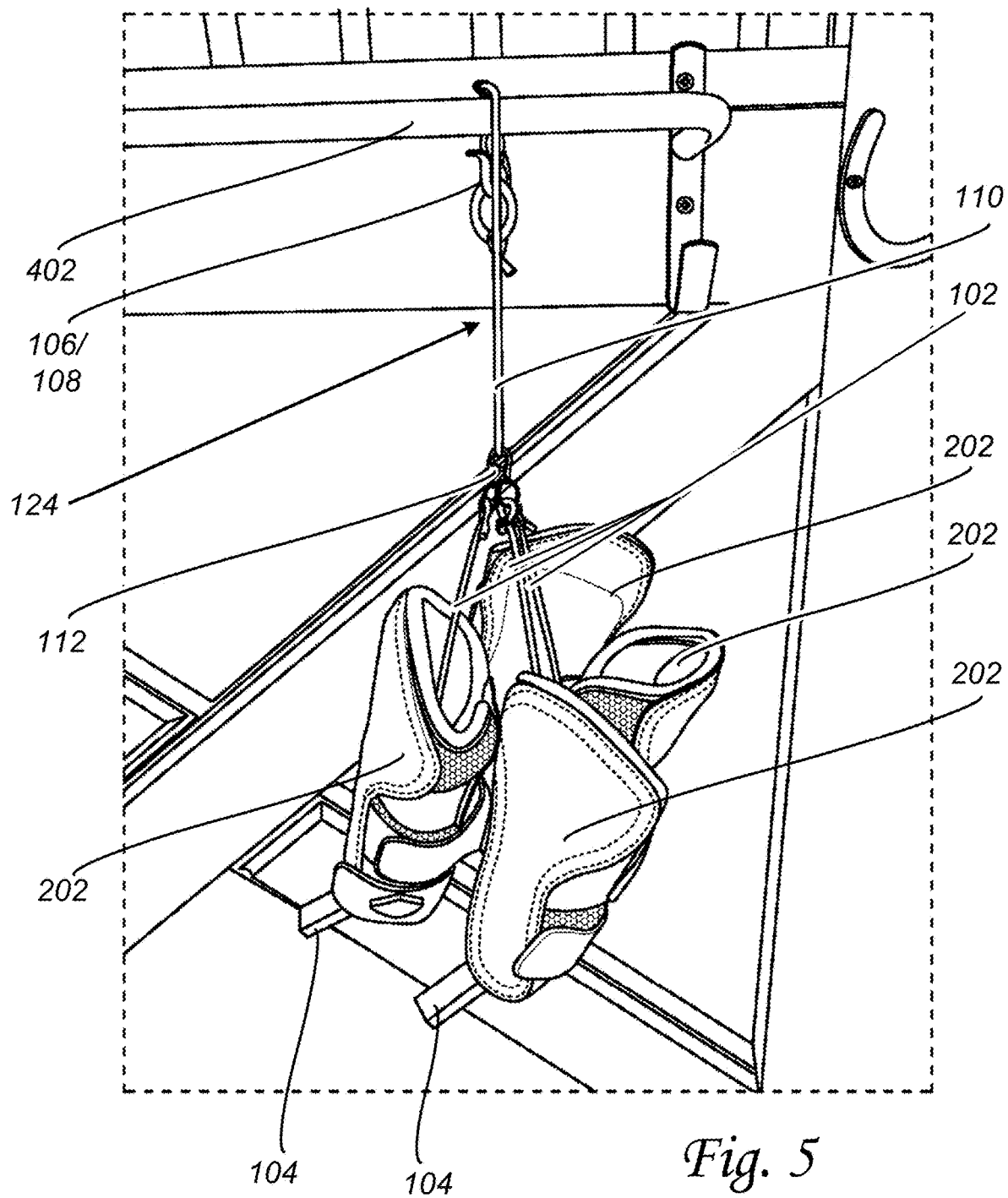

Referring to FIGS. 3-5, there are illustrated exemplary embodiments of a horse boot dryer. In an exemplary embodiment, a horse boot dryer 100 can comprise a hanging tether 110 that interconnects at both ends forming a drying loop 124. In operation, the drying loop 124 can be hung from an elevated object 402. The horse boot dryer 100 can comprise at least one boot holder rod 104, and at least one tether cord 102. The tether cord 102 connects at one end to the drying loop 124 and connects at the other end to the boot holder rod 104. In operation, the boot holder rod 104 can be inserted through a horse boot 202 and orientated to span the horse boot opening 204, preventing the horse boot 202 from sliding off of the tether cord 102 and allowing the horse boot 202 to hang and dry from the horse boot dryer 100.

In an exemplary embodiment and with reference to FIGS. 1 and 5, at least one latching tether fastener 112 can be secured to one end of the tether cord 102. The latching tether fastener 112 can be interconnected, in a removable manner, to and hang from the drying loop 124.

Referring to FIG. 5, in an exemplary embodiment, a horse boot dryer 100 can comprise a ring 108, a latching fastener 106, and a hanging tether 110. One end of the hanging tether 110 can be secured to ring 108 and the other end of the hanging tether 110 can be secured to the latching fastener 106. The latching fastener 106 and the ring 108 interlocks, in a removable manner, forming a drying loop 124. In operation, the drying loop 124 can be hung from an elevated object 402. The horse boot dryer 100 can further comprise at least one latching tether fastener 112, at least one boot holder rod 104, and at least one tether cord 102. One end of the tether cord 102 can be secured to the latching tether fastener 112 and the other end of the tether cord 102 can be secured to the boot holder rod 104. The latching tether fastener 112 interlocks, in a removable manner, and hangs from the drying loop 124. In operation, the boot holder rod 104 passes through and is orientated to span the opening of a horse boot 202, preventing the horse boot 202 from falling off the tether cord 102, and allowing the horse boot 202 to hang and dry from the horse boot dryer 100.

Figure 6:
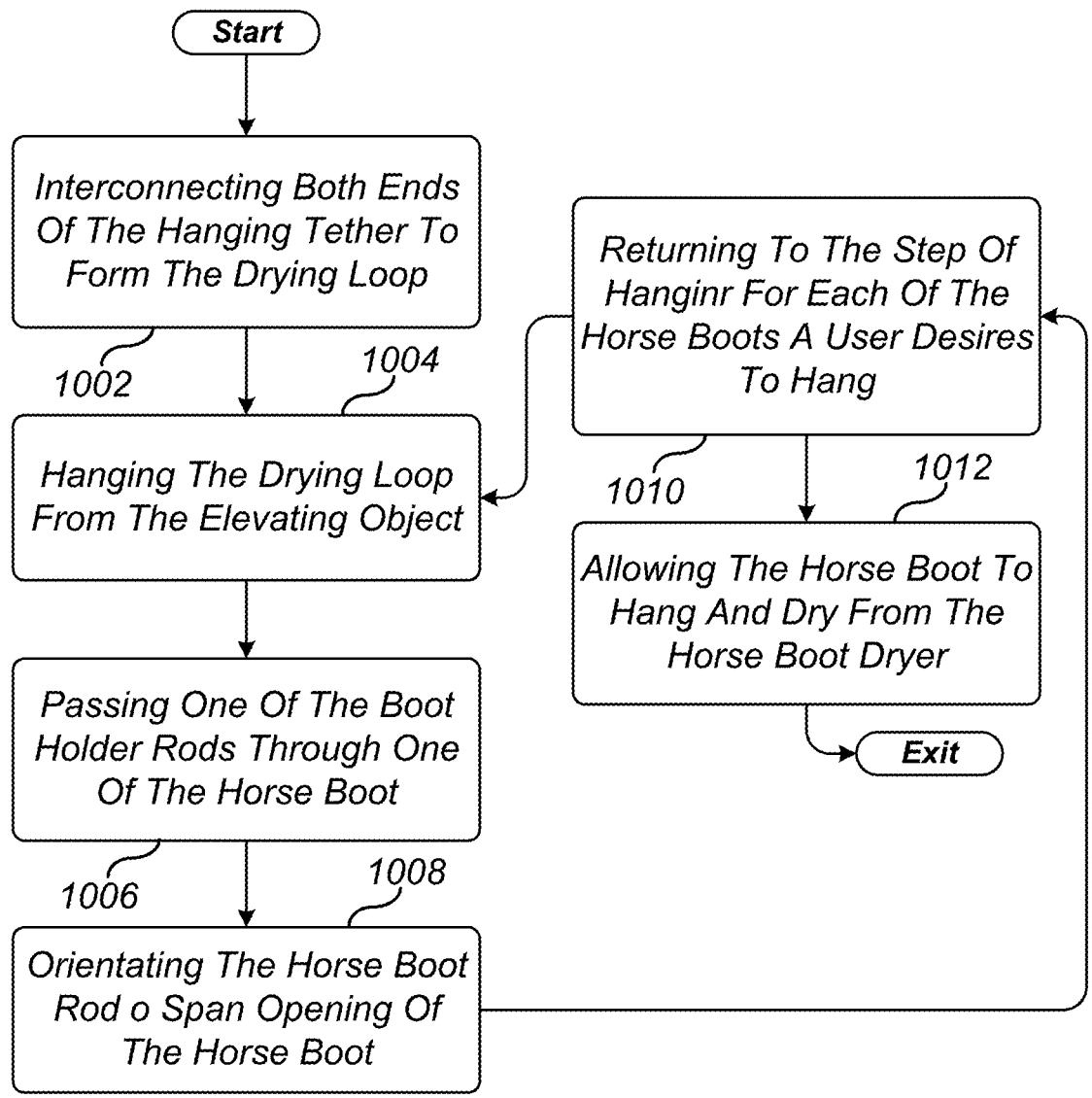
FIG. 6 illustrates one example of a method of using a horse boot dryer.

Referring to FIG. 6, there is illustrated one example of a method of using a horse boot dryer 100. In an exemplary embodiment, the method begins in step 1002 by interconnecting both ends of the hanging tether 110 to form the drying loop 124.

The method then continues in step 1004 by hanging the drying loop 124 from the elevated object 402, and in step 1006 by passing one of the boot holder rods 104 through one of the horse boots 202.

The method then continues in step 1008 by orientating the horse boot rod 104 to span the opening 204 of the horse boot 202, preventing the horse boot 202 from sliding off of the tether cord 102, in step 1010 returning to the step of hanging for each of the horse boots 202 a user 502 desires to hang, and in step 1012 allowing the horse boots 202 to hang and dry from the horse boot dryer 100.

While the preferred embodiment of the invention has been described, it will be understood that those skilled in the art, both now and in the future, may make various improvements and enhancements.

What is claimed is:

1. A method of drying a horse boot using a horse boot dryer, the method comprising:
    interconnecting both ends of a hanging tether to form a drying loop, the hanging tether configured to be hung from an elevated object;
    hanging the drying loop from the elevated object;
    securing at least one tether cord at one end to the drying loop;
    securing the other end of the at least one tether cord to at least one boot holder rod;
    passing the at least one boot holder rod through the horse boot;
    orienting the at least one boot holder rod to span an opening of the horse boot to prevent the horse boot from sliding off the at least one tether cord;
    returning to the step of securing at least one tether cord at one end to the drying loop, for each horse boot a user desires to dry; and
    allowing the horse boot to hang and dry from the horse boot dryer.

2. The method in accordance with claim 1, further comprising:
    a buckle; and
    a receiver, wherein one end of the hanging tether is secured to the buckle and the other end is secured to the receiver, the buckle and the receiver being configured to interlock in a removable manner to form the drying loop with the hanging tether.

3. The method in accordance with claim 1, further comprising:
    a ring; and
    latching fastener, wherein one end of the hanging tether is secured to the ring and the other end is secured to the latching fastener, the latching fastener and the ring being configured to interlock in a removable manner to form the drying loop with the hanging tether.

4. The method in accordance with claim 1, further comprising:
    at least one latching tether fastener, the at least one latching tether fastener is secured to one end of the at least one tether cord, and the at least one latching tether fastener interconnects with the drying loop, in a removable manner, to hang the at least one tether cord from the drying loop.

5. The method in accordance with claim 4, wherein the at least one latching tether fastener comprises a spring clip, hook, or carabiner configured to removably attach the at least one tether cord to the drying loop.

6. The method in accordance with claim 1, wherein the at least one boot holder rod having a hole therethrough, the at least one tether cord is attached to the at least one boot holder rod by passing through the hole and knotting, bead tying, or crimping to itself, preventing the at least one tether cord from being pulled back through the hole.

7. The method in accordance with claim 6, wherein the hole is centrally located along the length of the at least one boot holder rod.

8. The method in accordance with claim 1, further comprising:
    a raised ridge end cap is formed on each end of the at least one boot holder rod, wherein the raised ridge end cap prevents the horse boot from sliding off the end of the at least one boot holder rod.

9. The method in accordance with claim 1, wherein the at least one tether cord is made from a stretchable material.

10. The method in accordance with claim 1, wherein the at least one boot holder rod is made from plastic, wood, metal, or a combination thereof.

11. The method in accordance with claim 1, wherein the at least one tether cord comprises an adjustable length configured to vary a hanging height of the boot holder rod relative to the drying loop.

12. A method of drying a horse boot using a horse boot dryer having a ring and a latching fastener, the method comprising:
    interconnecting one end of a hanging tether to the ring and the other end to the latching fastener to form a drying loop, wherein the latching fastener and the ring interlock in a removable manner, and the drying loop is configured to be hung from an elevated object;
    hanging the drying loop from the elevated object;
    securing at least one tether cord at one end to a latching tether fastener;
    securing the other end of the at least one tether cord to at least one boot holder rod;

removably connecting the latching tether fastener to the drying loop;

passing the at least one boot holder rod through the horse boot;

orienting the at least one boot holder rod to span an opening of the horse boot to prevent the horse boot from sliding off the at least one tether cord;

returning to the step of securing at least one tether cord at one end to the latching tether fastener, for each horse boot a user desires to dry; and allowing the horse boot to hang and dry from the horse boot dryer.

13. The method in accordance with claim 12, wherein the at least one boot holder rod having a hole therethrough, the at least one tether cord is attached to the at least one boot holder rod by way of passing through the hole and knotting, bead tying, or crimping to itself, preventing the at least one tether cord from being pulled back through the hole.

14. The method in accordance with claim 13, wherein the hole is centrally located along the length of the at least one boot holder rod.

15. The method in accordance with claim 12, further comprising:

a raised ridge end cap is formed on each end of the at least one boot holder rod, wherein the raised ridge end cap prevents the horse boot from sliding off the end of the at least one boot holder rod.

16. The method in accordance with claim 12, wherein the at least one boot holder rod is made from plastic, wood, metal, or a combination thereof.

17. The method in accordance with claim 12, wherein the at least one boot holder rod is configured to nest the horse boot between two raised ridge end caps formed on opposing ends of the boot holder rod.

18. A method of drying a horse boot using a horse boot dryer having a buckle and a receiver, the method comprising:

interconnecting one end of a hanging tether to the buckle and the other end to the receiver to form a drying loop, wherein the buckle and the receiver interlock in a removable manner, and the drying loop is configured to be hung from an elevated object;

hanging the drying loop from the elevated object;

securing at least one tether cord at one end to a latching tether fastener;

securing the other end of the at least one tether cord to at least one boot holder rod;

removably connecting the latching tether fastener to the drying loop;

passing the at least one boot holder rod through the horse boot;

orienting the at least one boot holder rod to span the opening of the horse boot to prevent the horse boot from sliding off the at least one tether cord;

returning to the step of securing at least one tether cord at one end to the latching tether fastener, for each horse boot a user desires to dry; and allowing the horse boot to hang and dry from the horse boot dryer.

19. The method in accordance with claim 18, further comprising:

a raised ridge end cap is formed on each end of the at least one boot holder rod, wherein the raised ridge end cap prevents the horse boot from sliding off the end of the at least one boot holder rod.

20. The method in accordance with claim 18, wherein the at least one tether cord is secured to the drying loop using a looped end and a fastener to maintain the loop.

* * * * *